United States Patent
Inagaki

(10) Patent No.: US 7,977,011 B2
(45) Date of Patent: Jul. 12, 2011

(54) FUEL STACK STRUCTURE WITH AN ADHESIVE LAYER

(75) Inventor: Toshiyuki Inagaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 888 days.

(21) Appl. No.: 10/582,673

(22) PCT Filed: Dec. 22, 2004

(86) PCT No.: PCT/IB2004/004237
§ 371 (c)(1),
(2), (4) Date: Jun. 22, 2006

(87) PCT Pub. No.: WO2005/067086
PCT Pub. Date: Jul. 21, 2005

(65) Prior Publication Data
US 2007/0082251 A1    Apr. 12, 2007

(30) Foreign Application Priority Data

Dec. 24, 2003  (JP) ................................ 2003-427382

(51) Int. Cl.
*H01M 2/08* (2006.01)
*H01M 2/16* (2006.01)
(52) U.S. Cl. .................... 429/509; 429/469; 429/460
(58) Field of Classification Search ............. 429/38, 429/35, 36, 30; 428/343
See application file for complete search history.

(56) References Cited

U.S. PATENT DOCUMENTS

| | | | | |
|---|---|---|---|---|
| 6,080,503 | A  * | 6/2000  | Schmid et al. | 429/35 |
| 6,316,139 | B1 * | 11/2001 | Uchida et al. | 429/36 |
| 2001/0049047 | A1 * | 12/2001 | Mizuno | 429/36 |
| 2003/0027031 | A1 | 2/2003 | Baldauf et al. | |
| 2003/0170450 | A1 * | 9/2003 | Stewart et al. | 428/343 |
| 2004/0028983 | A1 | 2/2004 | Hayashi et al. | |
| 2004/0142226 | A1 * | 7/2004 | Yamauchi et al. | 429/38 |
| 2004/0197563 | A1 * | 10/2004 | Kye | 428/413 |

FOREIGN PATENT DOCUMENTS

| | | |
|---|---|---|
| EP | 0 918 362 A3 | 5/1999 |
| EP | 0 933 826 A1 | 8/1999 |
| EP | 1 443 579 A2 | 8/2004 |
| JP | A 7-249417 | 9/1995 |
| JP | A 9-289029 | 11/1997 |
| JP | A-11-154522 | 6/1999 |

(Continued)

OTHER PUBLICATIONS

"Araldite 2018 Technical Data Sheet" Huntsman Advanced Materials. Apr. 2007 www.intertronics.co.uk/data/ara2018.pdf.*

(Continued)

*Primary Examiner* — Keith Walker
(74) *Attorney, Agent, or Firm* — Oliff & Berridge, PLC

(57) ABSTRACT

(1) In a fuel cell stack structure wherein a stack is formed by stacking cells each of which is formed by sandwiching an MEA between two separators, an adhesive layer 33a is provided between the two separators sandwiching the MEA, without a constant thickness structure or pseudo constant thickness structure provided between the separators. (2) An adhesive layer 33b is provided between adjacent cells, without a bead gasket provided therebetween. (3) The adhesive layers 33a, 33b have a Young's modulus of 100 MPa or less.

12 Claims, 5 Drawing Sheets

FOREIGN PATENT DOCUMENTS

| | | |
|---|---|---|
| JP | A-11-219714 | 8/1999 |
| JP | A-2000-182639 | 6/2000 |
| JP | A-2001-357861 | 12/2001 |
| JP | A 2003-86229 | 3/2003 |
| JP | A-2004-055350 | 2/2004 |
| WO | WO 01/48845 A2 | 7/2001 |
| WO | WO 02/25753 A1 | 3/2002 |
| WO | WO 02/078108 A1 | 10/2002 |

OTHER PUBLICATIONS

Foreign Office Action issued in corresponding Japanese Application No. 2003-427382 on Aug. 21, 2009.

* cited by examiner

FUEL STACK STRUCTURE WITH AN ADHESIVE LAYER

BACKGROUND OF THE INVENTION

1. Field of the Invention

The invention relates to a stack structure of a fuel cell battery.

2. Description of the Related Art

As disclosed in Japanese Patent Application Publication No. JP-A-7-249417, or as shown in FIG. 5, fuel cell batteries, for example, solid polymer electrolyte fuel cell batteries, have a stack structure that is formed by stacking unit cells 4. Each unit cell 4 is formed by sandwiching a membrane-electrode assembly (MEA) 2 between two separators 3, and the stack structure is secured with a fastening load applied in the cell stacking direction.

A central portion of each unit cell 4 in directions along the plane of the cell is an electricity generation region 5 that generates electricity upon supply of a fuel gas and an oxidizing gas to the MEA. A portion around the electricity generation region 5 is a non-electricity generation region 6 that seals in the fuel gas, the oxidizing gas, and cooling water. In the non-electricity generation region 6 of each cell 4, the two separators 3 form a fixed-dimension structure in which an electrolyte membrane 1 is sandwiched between hard resin frames 7 (the "fixed-dimension structure" herein refers to a structure in which one of the separators and the other separator or the separators and the electrolyte membrane bear loads by directly contacting each other without an intervening adhesive layer, and are provided with a uniquely defined dimension).

The fixed-dimension structure may include a pseudo fixed-dimension structure as well as the true fixed-dimension structure (the "pseudo fixed-dimension structure" herein refers to a structure in which one of the separators and the other separator or the separators and the electrolyte membrane bear loads by contacting each other through an intervening adhesive layer 8 that is thin (thinner than 50 μm) and is hard (the Young's modulus E thereof is greater than 100 MPa), and are provided with a uniquely defined dimension).

However, the conventional stack structure has the following problems.

1) The load on the MEA varies, so that the durability of the MEA reduces.

Since the constant thickness structure or pseudo constant thickness structure of the separators, and the MEAs have varying dimensions due to production and assembly, the load that acts on the MEAs upon application of a fastening load to the stack considerably varies and deviates from a target value. If the load on an MEA deviates from the target value to a larger side, the durability of the MEA reduces. If the load on an MEA deviates to a smaller side, the contact resistance of the MEA increases, and therefore degraded performance of the fuel cell results.

2) Large fastening load is needed.

The fastening load needs to be large so as to reliably attain a necessary surface pressure in the electricity generation region despite the variation of the load on the MEAs.

3) There is a possibility of cracking or deformation of separators due to the increased fastening load.

The application of extra fastening load raises the possibility of cranking of separators if they are made of carbon, and the possibility of deformation of separators if they are made of a metal.

4) Management of the MEA surface pressure is difficult.

Since the fastening load depends on the dimensional variations of the MEAs and the constant thickness structures or pseudo constant thickness structures of the separators, it is difficult to control the load on the MEAs by the stack fastening load.

The invention is intended to solve problems including 1) unstable durability of the MEA, 2) large stack fastening load, 3) possible cracking and deformation of separators, 4) difficult management of the MEA surface pressure, etc.

SUMMARY OF THE INVENTION

It is an object of the invention to provide a fuel cell stack structure that allows 1) stabilization of the durability of the MEA, 2) reduction of the stack fastening load, 3) substantial prevention of the cracking and deformation of the separators, and 4) easy management of the MEA surface pressure, as compared with the conventional fuel cell stack structure.

According to a first aspect of the invention, a structure of a fuel cell stack comprising a plurality of cells each formed by interposing an MEA including an electrolyte membrane, a catalyst layer and a diffusion layer between two separators, each of the cells having a power generation region in which power is generated and a non-power generation region in which power is not generated, characterized in that, an adhesive layer is provided between the separators in at least one of the cells, wherein the non-power generation region includes at least one of: (i) a region where the electrolyte membrane is located between the separators, and a portion of the adhesive layer is provided between the electrolyte membrane and one of the separators, and (ii) another region where the electrolyte membrane is not located and another portion of the adhesive layer is provided between the separators.

In the first aspect, the adjacent cells may sandwich another adhesive layer.

In the first aspect, the adhesive layer may have a Young's modulus of at most 100 MPa.

According to the first aspect, the variation of the load on the MEA caused by a constant thickness structure or pseudo constant thickness structure in the conventional cell stack can be eliminated. Therefore, the load that acts on the MEA will not considerably deviate from a target value, and therefore the durability of the MEA becomes stable.

Furthermore, since, unlike the conventional fuel cell stack, there occurs no variation of the load on the MEA caused by the dimensional variation of a constant thickness structure or pseudo constant thickness structure, it is no longer necessary to provide an extra fastening load for ensuring the application of a needed load to the MEA despite load variation. Therefore, a corresponding reduction of the stack fastening load is possible.

Furthermore, since it is not necessary to apply an extra fastening load, the cracking or deformation of separators is unlikely.

Furthermore, in the foregoing structure, the constant thickness structure or pseudo constant thickness structure in the conventional fuel cell stack is replaced by the adhesive layer. Therefore, since the load bearing by the constant thickness structure or pseudo constant thickness structure is eliminated, a major portion of the stack fastening load applied from outside is received by the electricity generation region. This means that the load on the MEA can be controlled by the stack fastening load applied from outside. As a result, the management of the MEA surface pressure becomes easy.

In the first aspect and its related aspects, the Young's modulus of the adhesive layer may be within a range of 50 MPa to 30 MPa.

In the first aspect and its related aspects, the adhesive layer may have a thickness of 50 μm to 150 μm.

In the first aspect and its related aspects, a rigid spacer may be provided in the adhesive layer.

In the first aspect and its related aspects, the adhesive layer may have a thickness that allows the adhesive layer to have a Young's modulus of at most 100 MPa even if a hard spacer is provided in the adhesive layer.

According to the foregoing aspects, the non-electricity generation region can be provided with a non-load bearing structure (i.e., a structure that bears substantially no stack fastening load).

In the first aspect and its related aspects, a plurality of multi-cell modules each formed by stacking a plurality of cells as mentioned above are linearly arranged in a cell stacking direction, and a bead gasket may be provided as a seal between the multi-cell modules, and a separator of an end cell of a multi-cell module which contacts the bead gasket may have a greater planar rigidity than a separator of a central cell of the multi-cell module.

In this aspect, if a whole stack of several hundred cells is formed by adopting a stack structure in which cells are adhered in a sealing fashion, low yield results because if the stack has one defective cell, all the cells of the stack are unusable. In order to avoid such an inconvenience, it is sometimes desired that multi-cell modules having several tens of cells be formed, and be arranged in line to form a stack.

In that case, it is desirable that the multi-cell modules be joined by disposing bead gaskets therebetween as seals instead of using an adhesive or the like so that the modules can be disassembled. However, since a construction free of constant thickness structure or pseudo constant thickness structure is adopted, the backup construction on the bead gasket back surface becomes a problem. This problem can be solved by the above-described fuel cell stack structure of the invention.

According to this fuel cell stack structure, since the bead gasket-contacting separator of the end cell of a multi-cell module has a greater planar rigidity than the separator of the central cell of the multi-cell module, the cracking or deformation of the separator of the end cell can be prevented even if the separator is pressed by the bead gasket.

In the first aspect and its related aspects, the planar rigidity of the separator of the end cell of the multi-cell module may be made greater than the planar rigidity of the separator of the central cell by placing a generally flat plate on the separator of the end cell. Thus, merely by placing a plate on the separator of the end cell, an increased rigidity of the end cell separator can be achieved without the need to change other structures.

In the first aspect, it is possible that only the adhesive layer be provided between the two separators.

In the first aspect, the adhesive layer may be provided between the separators in the entire non-power generation region.

In the first aspect, the adhesive layer may contain rigid beads each of which has a diameter equal to or smaller than a thickness of the adhesive layer.

DETAILED DESCRIPTION OF THE PREFERRED EMBODIMENTS

Figure 1:
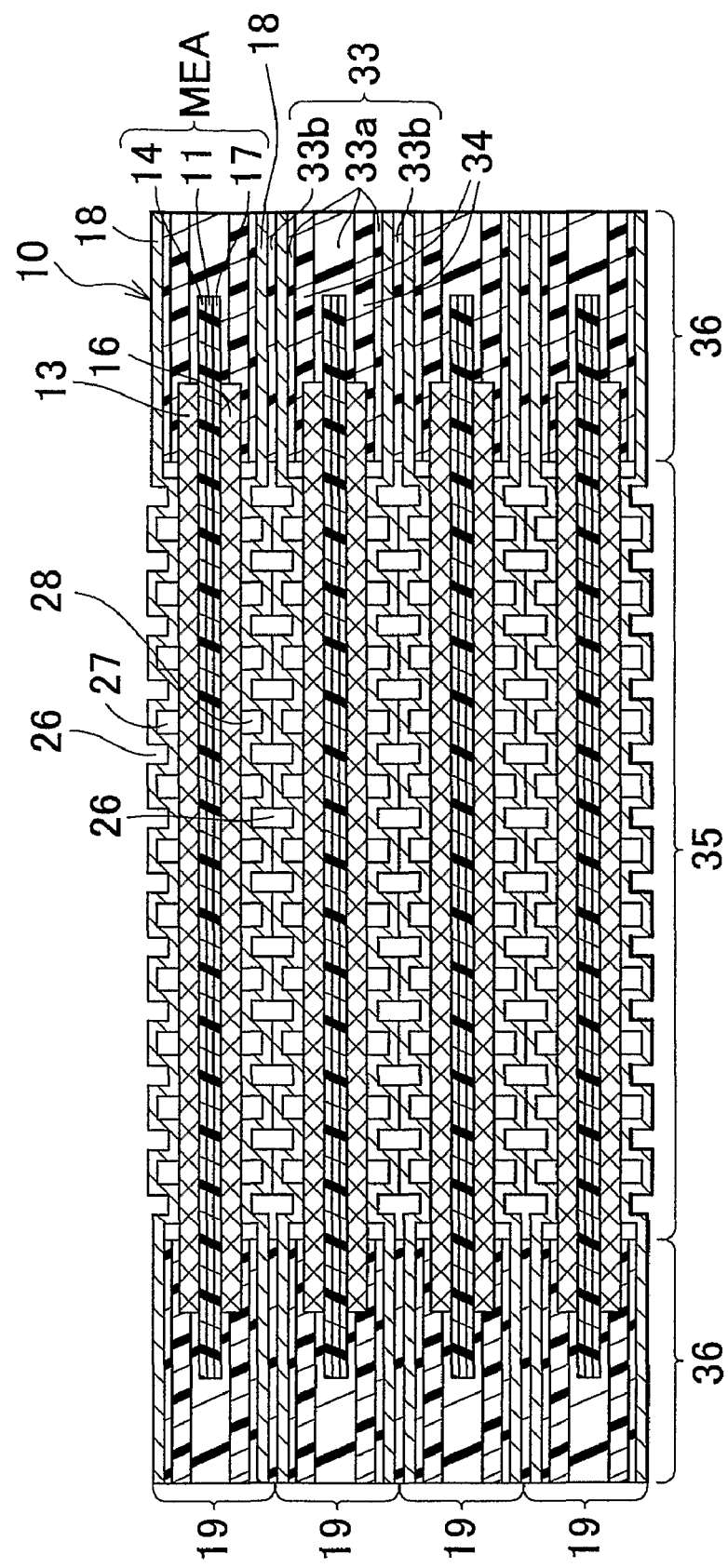
FIG. 1 is a fragmental sectional view of a fuel cell stack structure in accordance with a first embodiment of the invention.
Figure 2:
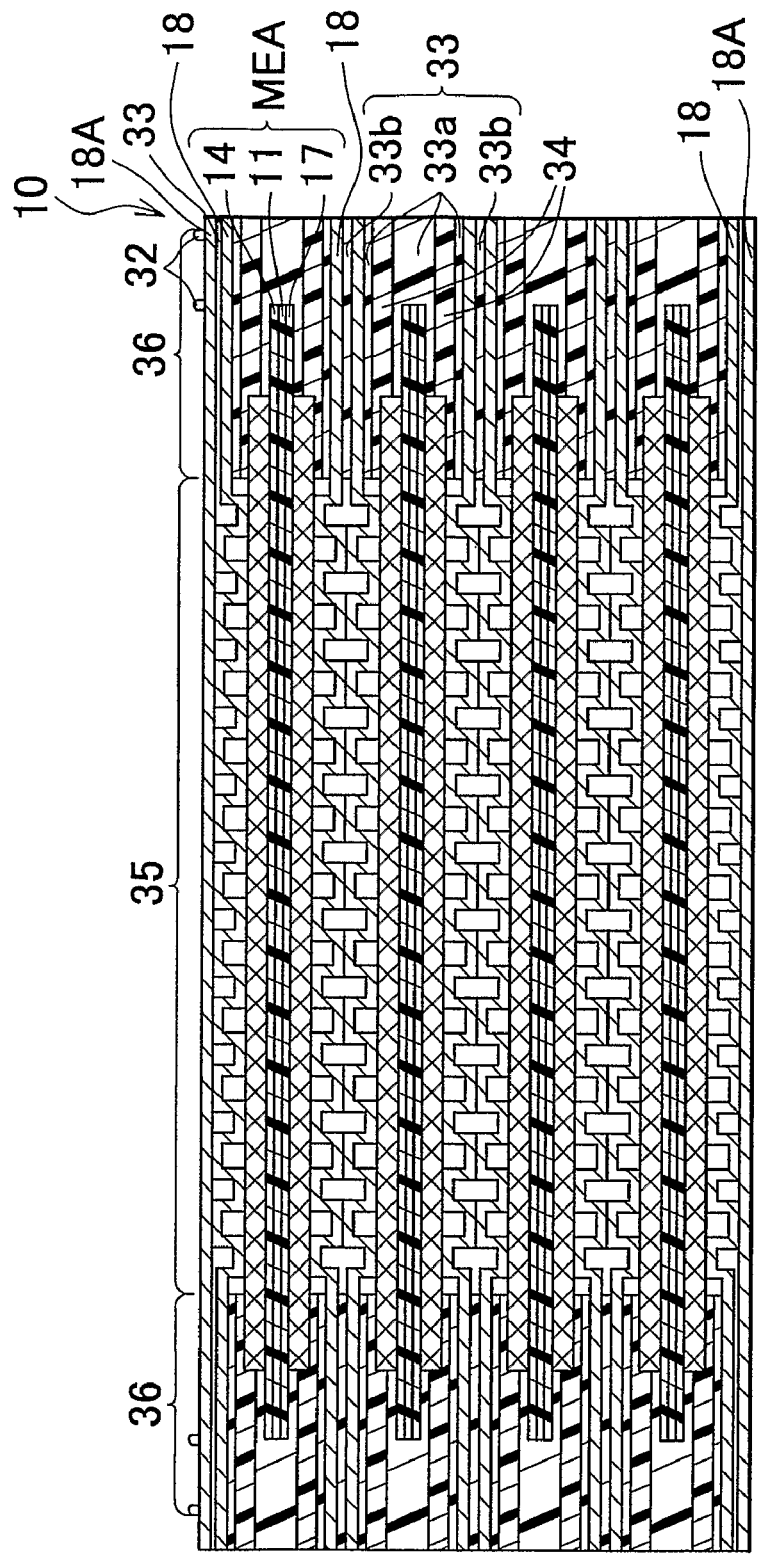
FIG. 2 is a fragmental sectional view of a fuel cell stack structure in accordance with a second embodiment of the invention.
Figure 3:
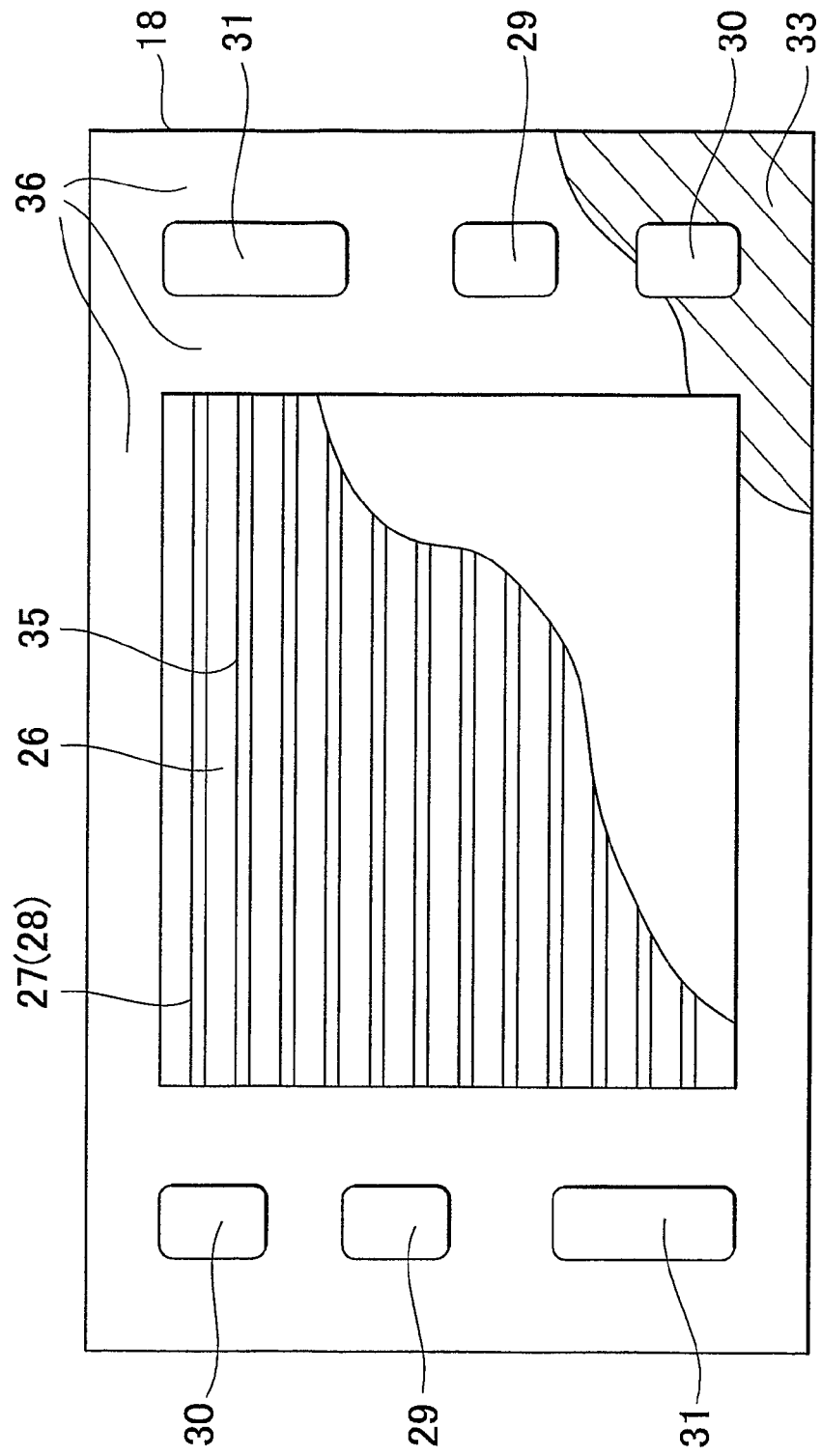
FIG. 3 is an elevation of a cell of the fuel cell stack structure in accordance with the first and second embodiments of the invention.
Figure 4:
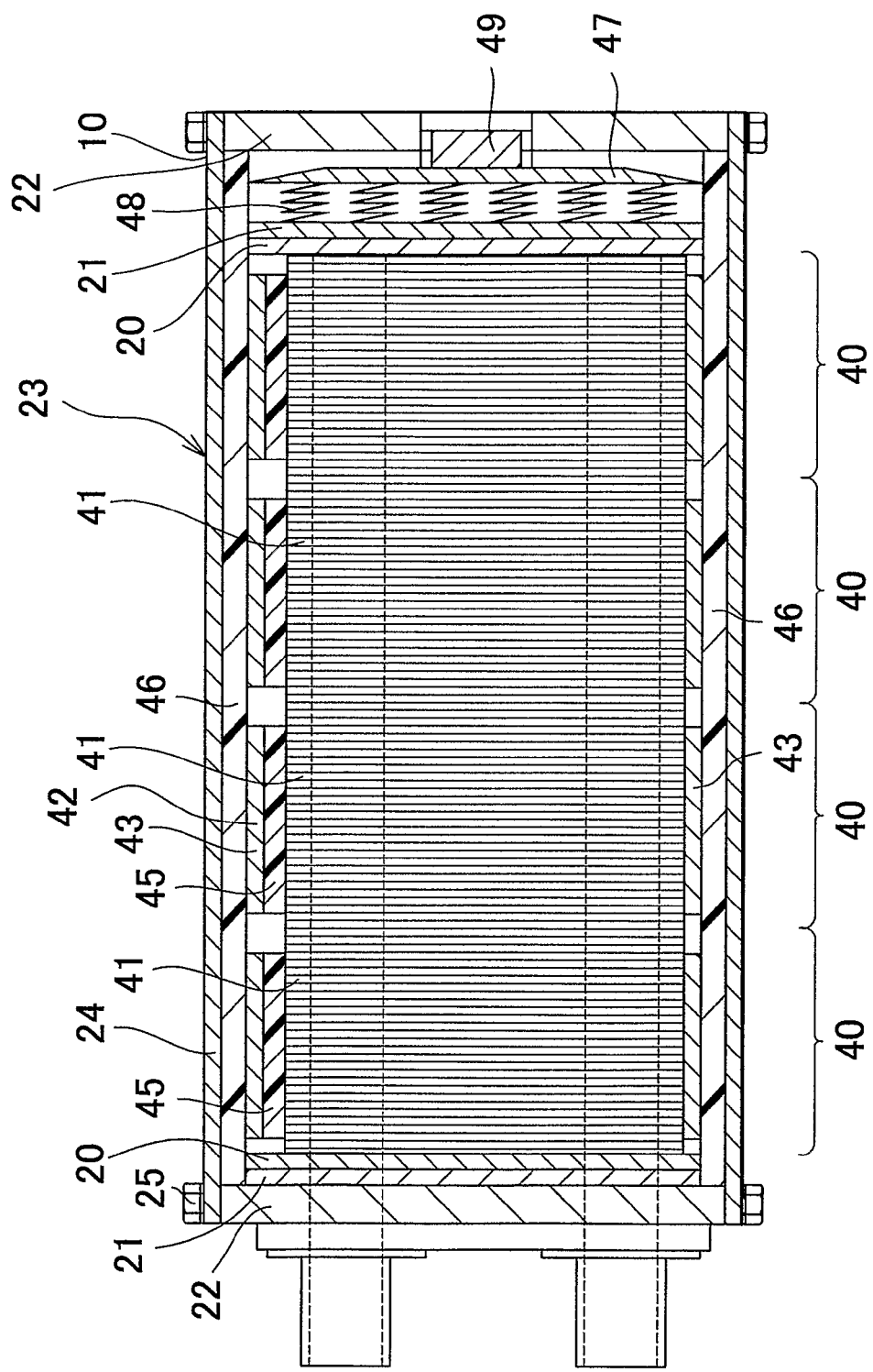
FIG. 4 is a sectional view of the entire fuel cell stack structure in accordance with the first and second embodiments of the invention.

The fuel cell stack structure of the invention will be described hereinafter with reference to FIGS. 1 to 4. FIG. 1 shows a first embodiment of the invention, and FIG. 2 shows a second embodiment of the invention. FIGS. 3 and 4 are applicable to both the first embodiment and the second embodiment of the invention. Portions common or similar between the first and second embodiments of the invention are represented by the same reference numerals in the drawings and description of the first and second embodiments of the invention.

Firstly, portions common or similar between the first and second embodiments of the invention will be described with reference to, for example, FIGS. 1, 3 and 4.

The fuel cell battery to which the stack structure of the invention is applied is, for example, a solid polymer electrolyte fuel cell battery 10. The fuel cell battery 10 is installed in, for example, a fuel cell motor vehicle. However, the fuel cell battery 10 may also be used for purposes other than motor vehicles.

The solid polymer electrolyte fuel cell battery 10 is formed by a stack of membrane-electrode assemblies (MEAs) and separators 18. The stacking direction is not limited to the vertical or horizontal directions, but may be any direction.

Each membrane-electrode assembly includes an electrolyte membrane 11 having an ion exchange membrane, an electrode (anode or fuel electrode) 14 having a catalytic layer disposed on a surface of the electrolyte membrane 11, and an electrode (cathode or air electrode) 17 having a catalytic layer disposed on another surface of the electrolyte membrane 11. Anode-side diffusion layers 13 and cathode-side diffusion layers 16 are provided between the membrane-electrode assemblies and the separators 18.

A unit cell 19 is formed by sandwiching an MEA between separators 18. A plurality of unit cells 19 are stacked to form a cell stack arrangement. Each of two opposite ends of the cell stack arrangement in the cell stacking direction is provided with a terminal 20, an insulator 21 and an end plate 22. The cell stack arrangement is clamped in the cell stacking direction, and is fixed by using bolts and nuts 25 and an outside member 24 extending in the cell stacking direction outside the cell stack arrangement. In this manner, a fuel cell stack 23 is formed.

The separators 18 may be any of carbon separators, metal separators, electrically conductive resin separators, combinations of metal separators and resin frames, and combinations of the foregoing separators and frames.

Each separator 18 has reaction gas channels 27, 28 (a fuel gas channel 27 and an oxidizing gas channel 28) for supplying a fuel gas (hydrogen) and an oxidizing gas (oxygen, or air in ordinary cases) to the anode 14 and the cathode 17, and further has in a reverse surface thereof a coolant channel 26 for conducting a coolant (cooling water in ordinary cases).

Coolant manifolds 29, fuel gas manifolds 30 and oxidizing gas manifolds 31 extend through the separators 18. The manifolds 29, 30, 31 are supplied with their respective fluids (coolant, fuel gas, oxidizing gas) from fluid supply pipes. The fluids flow from inlet sides of the manifolds 29, 30, 31 into cell channels 26, 27, 28, and flow out of the cell channels 26, 27, 28 into outlet sides of the manifolds 29, 30, 31, and then exit from fluid discharge pipes.

Each cell 19 has an electricity generation region 35, and a non-electricity generation region 36 around the region 35. The reaction gas channels 27, 28, and the coolant channel 26 provided on the reverse surface are formed in the electricity generation region 35. The manifolds 29, 30, 31 are formed in the non-electricity generation region 36. In order to prevent mixture of the different fluids, seals are provided between the separators 18 of each cell 19 and between the separators 18 of adjacent cells 19.

In each cell 19, an adhesive layer 33 (33a) is provided between the two separators 18 sandwiching the MEA, and neither a constant thickness structure nor a pseudo constant thickness structure is provided therebetween. In this structure, an adhesive layer 33 exists in each space between the separators 18 and electrolyte membrane 11 and the space between the two separators 18 of each cell 19. Therefore, in the non-electricity generation region, the two separators 18 of each cell 19 do not directly contact each other. Furthermore, in the non-electricity generation region, the separators 18 do not directly contact the electrolyte membrane 11, and do not directly clamp the electrolyte membrane 11.

In spaces between adjacent cells 19, the non-electricity generation region is not provided with a bead gasket, but is provided with an adhesive layer 33 (33b).

The adhesive layer 33 (33a, 33b) is an adhesive layer that has a Young's modulus of 100 MPa or less and is softer than the conventional adhesive layer (the Young's modulus of the conventional adhesive layer is greater than 100 MPa).

It is more preferable that the Young's modulus of the adhesive layer 33 (33a, 33b) be within the range of 50 MPa to 30 MPa.

The adhesive layer 33 (33a, 33b) has a thickness of 50 to 150 μm, and is thicker than the conventional adhesive layer (the thickness of the conventional adhesive layer is less than 50 μm). The adhesive layer 33 may contain hard beads. In that case, the diameter of the beads must be less than or equal to the thickness of the adhesive layer 33.

Figure 5:
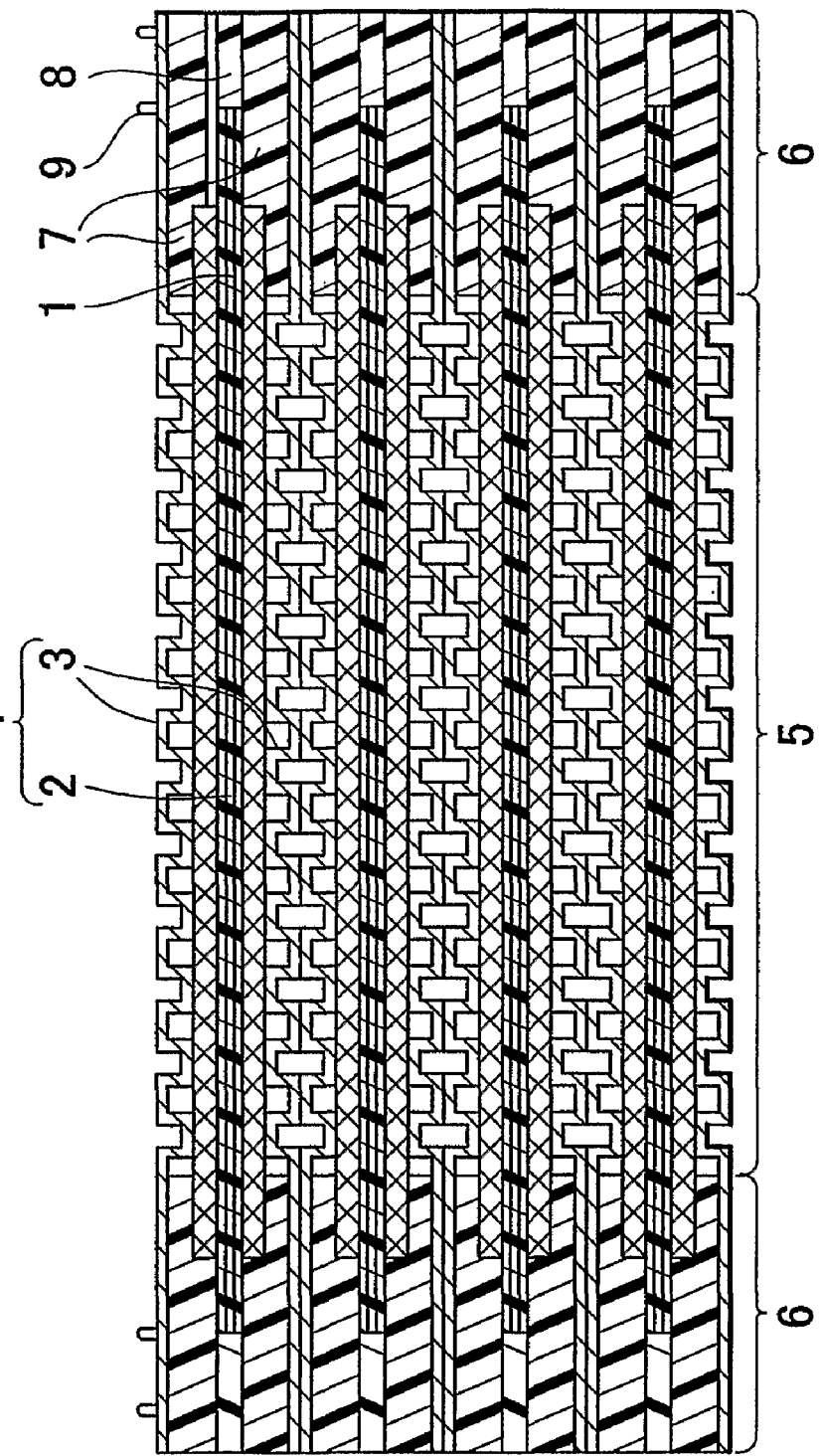
FIG. 5 is a fragmental sectional view of a conventional fuel cell stack structure.

A spacer 34 made of a hard material (e.g., a resin) may be inserted in the adhesive layer 33 (33a, 33b) in order to reduce the amount of adhesive. In the construction shown in FIG. 1, spacers 34 (having a less thickness than the resin frame 7 shown in FIG. 5) are inserted between the separators 18 of each unit cell 19. However, spacers may also be inserted between the separators 18 of adjacent cells 19.

Even if a spacer 34 is inserted, the adhesive layer 33 (33a, 33b) has a thickness that allows the adhesive layer 33 to have a Young's modulus of 100 MPa or less. If the adhesive layer 33 is excessively thin, the adhesive layer 33 may lose the capability of serving as an elastic layer. Therefore, the adhesive layer 33 is provided with a thickness that allows the adhesive layer 33 to have a Young's modulus of 100 MPa.

If a plurality of adhesive layers 33 exist between the separators 18 of a unit cell 19 in the case where a spacer 34 is inserted between the separators 18, the total thickness of the adhesive layers 33 is defined as the aforementioned thickness of the adhesive layer 33. In FIG. 1, two spacers 34 are inserted between the two separators 18 of each cell 19, so that three adhesive layers 33 exist between the two separators 18. In this construction, it is appropriate that the total thickness of the three layers be set so that the adhesive layer 33 formed by the three layers has a Young's modulus of 100 MPa or less.

As shown in FIG. 4, the stack 23 may be a stack structure in which a plurality of multi-cell modules 40 (e.g., ten modules) each of which is formed by stacking a plurality of cells 19 (e.g., several cells to several tens of cells, for example, twenty cells) are arranged in line in the cell stacking direction and bead gaskets 32 are provided as seals between the multi-cell modules 40. An in-line arrangement of ten multi-cell modules 40 each having twenty cells makes a stack 23 of two hundred cells.

If the stack 23 has multi-cell modules 40, the fuel cell stack 23 has a plurality of multi-cell modules 40 arranged in line in the cell stacking direction, and an outside member 24.

Each multi-cell module 40 has a multi-cell assembly 41 formed by stacking a plurality of cells, and a module frame 42 having a first wall 43 that surrounds the multi-cell assembly 41 and extends in the cell stacking direction of the multi-cell assembly 41.

The outside member 24 extends in the cell stacking direction outside the multi-cell modules 40 and over all the multi-cell modules 40.

In each multi-cell module 40, the multi-cell assembly 41 thereof is not restrained in the cell stacking direction by the module frame 42 of the multi-cell module 40, so that thermal expansions of the cells 19 in the cell stacking direction can be relieved.

In each multi-cell module 40, a space is formed or a deformable adhesive member 45 is provided between an outer surface of the multi-cell assembly 41 of the multi-cell module 40 and an inner surface of the first wall 43 of the module frame 42 of the multi-cell module 40, in order to relieve thermal expansions of the cells 19 that occur in directions orthogonal to the cell stacking direction.

An external restrainer member 46 is provided between an inner surface of the outside member 24 and outer surfaces of the first walls 43 of the module frames 42 of the individual multi-cell modules 40. It is desirable that the external restrainer member 46 be formed from a deformable material so as to absorb differences in the thermal expansion in directions orthogonal to the cell stacking direction between the outer surface of each first wall 43 and the inner surface of the outside member 24. Examples of such a deformable material include a resin, a glass-mixed epoxy material, etc. However, the material of the external restrainer member 46 is not limited to the resin or the glass-mixed epoxy material.

Since the external restrainer member 46 is disposed between the outer surface of each first wall 43 and the inner surface of the outside member 24, the inertia force that acts on the multi-cell modules 40 at the time of a vehicle collision or the like can be received by the outside member 24 via the external restrainer member 46. Since the external restrainer member 46 is formed of a deformable material, the external restrainer member 46 is able to absorb differences in thermal expansion in directions orthogonal to the cell stacking direction between the outer surface of each first wall 43 and the inner surface of the outside member 24.

A spring box 47 is disposed in line in the cell stacking direction with respect to the plural multi-cell modules 40 disposed in line in the cell stacking direction. A spring force (constant load) from the spring box 47 is exerted on each one of the multi-cell modules 40 in the cell stacking direction. The spring box 47 has a plurality of springs 48 that are arranged in parallel with each other. The spring box 47 is provided in an end portion of the stack 23 where the supply and discharge pipes for the different fluids are not connected. The spring box 47 is disposed between the insulator 21 and the end plate 22.

The spring force from the spring box 47 can be adjusted by an adjust screw 49 provided between the spring box 47 and the end plate 22.

The operations and advantages common between the first embodiment and the second embodiment of the invention will be described.

In the fuel cell stack structure of the invention, since the adhesive layer 33 (33*a*) is provided between the two separators 18 sandwiching an MEA without provision of a constant thickness structure (denoted by 7 in FIG. 5) or a pseudo constant thickness structure (denoted by 8 in FIG. 5), it becomes possible to eliminate variation of the load on the MEA caused by the varying dimensions of MEAs due to production errors or the like. Therefore, the load on the MEA does not considerably deviate from a target value. Hence, there is no reduction in the durability of the MEA caused by the load deviating from the target value to the larger side, and the durability of the MEA becomes stable. Furthermore, the deterioration in the fuel cell performance caused by the load deviation from the target value to the smaller side is unlikely since there is no considerable deviation of the load on the MEA from the target value.

For example, in the case where the fastening load that needs to be applied to the MEA in order to reduce the contact resistance is 2 tons and an extra fastening load of 2 tons is applied in order to ensure the application of the needed load to the MEA despite load variation, that is, a fastening load of 4 tons in total is applied, the durability of the MEA becomes remarkably less than in the case where the total fastening load is 2 tons. However, in the foregoing construction, since the provision of a constant thickness structure or pseudo constant thickness structure is abolished, the variation of the load on the MEA can be eliminated, and therefore the fastening load can be set at 2 tons. Thus, the durability of the MEA can be increased.

Furthermore, since, unlike the conventional fuel cell stack, there occurs no variation of the load on the MEA caused by the dimensional variation of a constant thickness structure or pseudo constant thickness structure, it is no longer necessary to provide an extra fastening load for ensuring the application of the needed load to the MEA despite load variation (an extra fastening load is applied in the conventional technology). Therefore, a corresponding reduction of the stack fastening load is possible according to the invention.

For example, in the case where a fastening load of 2 tons is needed in order to attain a needed contact surface pressure of the MEA, the conventional technology requires the application of an extra fastening load of 2 tons in order to ensure the application of the needed load to the MEA despite load variation, that is, requires the application of a fastening load of 4 tons in total. In the same case, the invention merely requires the application of the load of 2 tons for attaining the needed contact surface pressure of the MEA plus a small amount of load α (α may be, for example, 0.2 ton). Thus, the invention reduces the applied fastening load from the conventional 4 tons to 2.2 ton.

Furthermore, since it is not necessary to apply an extra fastening load, the cracking or deformation of separators is unlikely. For example, if, in the case where a fastening load of 2 tons is needed in order to attain a needed contact surface pressure of the MEA, an extra fastening load of 2 tons is applied in order to ensure the application of the needed load to the MEA despite load variation, that is, a fastening load of 4 tons in total is applied as in the conventional art, the extra load of 2 tons may act on the non-electricity generation region, leading to the possible cracking or deformation of separatos. In the same case, the invention merely requires the application of the load of 2 tons for attaining the needed contact surface pressure of the MEA plus a small amount of load α (α may be, for example, 0.2 ton), so that only the load α of 0.2 ton may act on the non-electricity generation region, which is a remarkable reduction from the conventional 2 ton. Thus, in the invention, the cracking or deformation of separators is unlikely.

In the structure of the invention, the constant thickness structure or pseudo constant thickness structure as in the conventional fuel cell stack is replaced by the adhesive layer 33*a*. Therefore, since the load bearing by the constant thickness structure or pseudo constant thickness structure as in the conventional technology is eliminated, a major portion of the stack fastening load applied from outside is received by the MEA of the electricity generation region. This means that the load on the MEA can be controlled by the stack fastening load applied from outside. As a result, the management of the MEA surface pressure becomes easy.

For example, if, in the case where a fastening load of 2 tons is needed in order to attain a needed surface pressure of the MEA, an extra fastening load of 2 tons is applied in order to ensure the application of the needed load to the MEA despite load variation, that is, a fastening load of 4 tons in total is applied, the load that actually acts on the MEA cannot be determined without conducting measurement. However, since the invention is free of the conventional load bearing by the constant thickness structure or pseudo constant thickness structure, a major portion of the stack fastening load of 2 tons applied from outside is received by the MEA of the electricity generation region, and therefore it becomes possible to control the load on the MEA by the stack fastening load of 2 tons applied from outside.

Since the load bearing by the constant thickness structure or pseudo constant thickness structure as in the conventional technology is eliminated, the load on the MEAs hardly varies. Therefore, the management of MEA surface pressure is easy; for example, the management thereof can be appropriately accomplished merely by controlling the stack fastening load to 2 tons. Since the spring force from the spring box 47 is consistent, the MEA surface pressure becomes substantially consistent in the invention. In contrast, if a predetermined stack fastening load is applied to a conventional stack having constant thickness structures or pseudo constant thickness structures, the load exerted on the MEAs considerably varies depending on the dimensional variations of the constant thickness structures or pseudo constant thickness structures and the MEAs.

Furthermore, since bead gaskets are not provided between adjacent cells 19 but the adhesive layers 33 (33*b*) are provided therebetween, it becomes possible to more reliably provide a structure in which the stack fastening load is borne by the electricity generation region 35, and is not borne by the non-electricity generation region 36 (non-load bearing structure of the non-electricity generation region 36).

Furthermore, since the adhesive layers are provided instead of bead gaskets, it is no longer necessary to adopt a fixed-dimension or pseudo fixed-dimension structure as a backup structure for the bead gasket on a side of each separator 18 which faces the back surface of the bead gasket. Therefore, the provision of a constant thickness structure-free structure on the bead gasket back surface side of the separator 18 will not cause any problem. If a bead gasket is provided, a constant thickness structure-free structure cannot be adopted and a fixed-dimension or pseudo fixed-dimension structure must be adopted as in the conventional fuel cell batteries.

Since the adhesive layer 33 (33*a*, 33*b*) is constructed so as to have a Young's modulus of 100 MPa or less, the bead gasket back surface side of the separators 18 can be considered to have a constant thickness structure-free structure, that is, the adhesive layer 33 allows formation of a non-load bearing structure that is a softer structure as compared with the adhesive layer of the conventional fuel cell battery. A more preferable range of the Young's modulus of the adhesive layer 33 is 50 MPa to 30 MPa.

Furthermore, since the adhesive layer 33 (33a, 33b) is constructed so as to have a thickness of 50 to 150 µm, the bead gasket back surface side of the separators 18 can be considered to have a constant thickness structure-free structure. A more preferable range of the thickness of the adhesive layer 33 is 90 µm to 110 µm.

Although the spacer 34 is inserted in the adhesive layer 33 (33a, 33b), the adhesive layer 33 is provided with a thickness that allows the adhesive layer to have a Young's modulus of 100 MPa or less. Therefore, despite the insertion of the spacer 34, it is possible to reliably provide the constant thickness structure-free structure.

If at least one of the foregoing conditions is adopted, the non-electricity generation region 36 can be provided with a non-load bearing structure (i.e., a structure that bears substantially no stack fastening load).

Next, the construction, operation and advantages of peculiar portions of individual embodiments of the invention will be described. It is to be noted that the foregoing description of the common portions of the embodiments will be partly repeated below.

First Embodiment

As shown in FIG. 1, the first embodiment of the invention has the following features: i) there is no constant thickness structure; ii) there is no pseudo constant thickness structure that receives load as a substitute for a constant thickness structure; iii) there is no bead gasket; and iv) in the non-electricity generation region 36 of the separators 18, the MEA-contacting surface and the cooling water-contacting surface both have an adhesion structure formed by the adhesive layer 33.

The operation and advantages of the first embodiment are as follows.

a) Since the constant thickness structure and the bead gasket are absent, the stack fastening load can be reduced. b) Application of the fastening load needed for reduction of the contact resistance of the MEA plus a load α (small amount) suffices. As a result, the MEA surface pressure can be managed by the fastening load. c) Since the extra load on the constant thickness structure is substantially eliminated or reduced, the cracking or deformation of separators is unlikely to occur.

Second Embodiment

In terms of yield, it is not easy to produce a whole stack by adopting the cell adhesion structure of the first embodiment of the invention. Therefore, in some cases, it is desired that a stack 23 be constructed as shown in FIG. 4, that is, by linearly arranging a plurality of multi-cell modules 40 each of which has several cells (e.g., at least five cells) to several tens of cells. In that case, adhesion of the multi-cell modules 40 is not desired, and therefore bead gaskets 32 are provided as seals between the multi-cell modules 40. However, since a constant thickness structure or pseudo constant thickness structure-free construction is adopted, the backup construction on the bead gasket back surface becomes a problem.

The second embodiment solves the problem.

In the second embodiment of the invention, the bead gasket 32-contacting separator 18 of an end cell of a multi-cell module 40 has a greater planar rigidity than the separators 18 of a central cell of the multi-cell module 40.

In this case, a plate 18A (which is referred to as "dummy separator" or "end structural member", and which is formed of, for example, a flat plate, and has holes of the manifolds 29, 30, 31) is placed on the separator 18 of the end cell. The plate 18A has a greater thickness than the separators 18, so as to attain an increased rigidity.

When the plate 18A is superimposed, the plate 18A and the contacting separator 18 of the end cell are adhered at the non-electricity generation region 36 in a sealing fashion. The adhesive used for the plate 18A may be the same adhesive that forms the adhesive layers 33.

The operation and advantages of the second embodiment are as follows.

a) While yield tends to deteriorate if a stack structure formed in a fashion of several hundred cell module adhesion is adopted, yield can be improved by adopting a stack structure of in-line arrangement of multi-cell modules each having several tens of cells. b) As for the sealing between the multi-cell modules, the bead gaskets 32 can be used due to the increased rigidity of the end cell separator, for example, the increased rigidity achieved by the plate 18A.

The invention claimed is:

1. A fuel cell stack comprising:
   a pair of separators;
   a membrane-electrode assembly (MEA) in which an electrolyte membrane, a catalyst layer, and a diffusion layer are laminated, and which is provided between the pair of separators; and
   an adhesive layer provided between the pair of separators, which contacts at least an end of the electrolyte membrane, an end of the catalyst layer and an end of the diffusion layer, wherein the adhesive layer has a Young's modulus within the range of 30 MPa to 50 MPa.

2. The fuel cell stack according to claim 1, wherein;
   the electrolyte membrane has an extended portion which extends beyond the end of the catalyst layer and the end of the diffusion layer, and
   a portion of the adhesive layer is provided between the extended portion of the electrolyte membrane and one of the pair of separators so as to contact a surface of the extended portion, and another portion of the adhesive layer is provided between the extended portion of the electrolyte membrane and another of the pair of separators so as to contact another surface of the extended portion.

3. The fuel cell stack according to claim 1, wherein;
   a portion of the adhesive layer is provided between one of the pair of separators and the catalyst layer so as to contact a surface of the catalyst layer; and another portion of the adhesive layer is provided between another of the pair of separators and the diffusion layer so as to contact a surface of the diffusion layer.

4. The fuel cell stack according to claim 1, wherein;
   the adhesive layer has a thickness of 50 µm to 150 µm.

5. The fuel cell stack according to claim 1, wherein a rigid spacer is provided in the adhesive layer.

6. The fuel cell stack according to claim 5, wherein the rigid spacer is provided in the adhesive layer throughout a non-generation region.

7. The fuel cell stack according to claim 5, wherein the adhesive layer has a thickness that allows the adhesive layer to have a Young's modulus of at most 50 MPa even if the hard spacer is provided in the adhesive layer.

8. The fuel cell stack according to claim 1, wherein multiple cells, each of which is formed by interposing the MEA between the pair of separators, are linearly arranged in a cell stacking direction, and the fuel cell stack further comprises an adhesive layer sandwiched between two cells adjacent to each other.

9. The fuel cell stack according to claim 1, wherein multiple cells, each of which is formed by interposing the MEA between the pair of separators, are linearly arranged in a cell stacking direction, and a bead gasket is provided as a seal between two of the multiple cells, which are adjacent to each other, and a separator of the two of the multiple cells which contacts the bead gasket has a greater planar rigidity than a separator of another cell which does not contact the bead gasket.

10. The fuel cell stack according to claim 6, further comprising a generally flat plate which is placed on the separator which contacts the bead gasket to increase the planar rigidity of the separator.

11. The fuel cell stack according to claim 1, wherein the adhesive layer is provided between the separators in an entire non-power generation region.

12. The fuel cell stack according to claim 1, wherein the adhesive layer contains rigid beads each of which has a diameter equal to or smaller than a thickness of the adhesive layer.

* * * * *